(12) United States Patent
Dagrossa (10) Patent No.: US 9,937,883 B2
(45) Date of Patent: Apr. 10, 2018

(54) BUMPER GUARD UTILIZING ADJUSTABLE TABS

(71) Applicant: Darrin Dagrossa, Douglaston, NY (US)

(72) Inventor: Darrin Dagrossa, Douglaston, NY (US)

(*) Notice: Subject to any disclaimer, the term of this patent is extended or adjusted under 35 U.S.C. 154(b) by 65 days.

(21) Appl. No.: 15/133,473

(22) Filed: Apr. 20, 2016

(65) Prior Publication Data

US 2017/0253205 A1   Sep. 7, 2017

Related U.S. Application Data

(60) Provisional application No. 62/303,478, filed on Mar. 4, 2016.

(51) Int. Cl.
*B60R 19/44* (2006.01)

(52) U.S. Cl.
CPC .................. *B60R 19/44* (2013.01)

(58) Field of Classification Search
CPC ... B60J 1/085; B60J 7/085; B60J 11/08; B60J 1/003; B60J 1/2011; B60J 1/2019; B60J 1/2025; B60J 1/2052; B60R 19/44; B60R 19/445; B60R 13/04; B60R 19/42; B60R 5/04
USPC ........ 296/142, 97.8, 98, 116, 138, 141, 143; 160/290.1, 122, 29, 294, 120, 314, 404, 160/59; 293/142.128, 1, 102, 109, 126, 293/143
See application file for complete search history.

(56) References Cited

U.S. PATENT DOCUMENTS

| | | | |
|---|---|---|---|
| 2,271,046 A | 1/1942 | Sing | |
| 3,178,204 A | 4/1965 | Croft | |
| 4,376,546 A * | 3/1983 | Guccione | B60R 19/02 150/166 |
| 4,726,614 A | 2/1988 | Myers et al. | |
| 4,997,229 A * | 3/1991 | Swanson | B60R 99/00 150/166 |
| 5,056,817 A * | 10/1991 | Fuller | B60R 99/00 150/166 |
| 5,618,073 A | 4/1997 | Criscione | |
| 7,073,830 B1 | 7/2006 | Chen et al. | |
| 7,527,320 B1 | 5/2009 | Nevell, Jr. | |
| 7,740,294 B2 * | 6/2010 | Malina | B60R 19/44 293/128 |
| D619,060 S | 7/2010 | Lorenzo | |

(Continued)

FOREIGN PATENT DOCUMENTS

DE   10249901 A1   5/2004

*Primary Examiner* — D Glenn Dayoan
*Assistant Examiner* — Sunsurraye Westbrook
(74) *Attorney, Agent, or Firm* — Richard L. Miller (57) ABSTRACT

A one-size fits-all protector for one of an any length front bumper cover of a vehicle and an any length rear bumper cover of the vehicle. The any length front bumper cover has a top and a pair of sides. The any length rear bumper cover has a top and a pair of sides. The vehicle has a grille, a pair of front wheel wells, a trunk, and a pair of rear wheel wells. The one-size fits-all protector includes a body and an attaching apparatus. The body overlies and protects by being length adjustable one of the any length front bumper cover and the any length rear bumper cover. The attaching apparatus replaceably attaches the body to the one of the any length front bumper cover and the any length rear bumper cover.

72 Claims, 7 Drawing Sheets

(56) References Cited

U.S. PATENT DOCUMENTS

| | | | |
|---|---|---|---|
| 9,505,363 B2* | 11/2016 | Judd | ................. B60R 19/44 |
| 2003/0034660 A1 | 2/2003 | Kelly | |
| 2005/0242558 A1 | 11/2005 | Cohen | |
| 2011/0198874 A1 | 8/2011 | Lee et al. | |
| 2015/0307046 A1 | 10/2015 | Fritsch | |

* cited by examiner

BUMPER GUARD UTILIZING ADJUSTABLE TABS

CROSS REFERENCE TO PREVIOUS APPLICATIONS

This application claims the priority of provisional application No. 62/303,478 filed on Mar. 4, 2016 in the United States Patent and Trademark Office, which is incorporated herein by reference.

BACKGROUND OF THE INVENTION

Field of the Invention

The present invention relates to a bumper guard, and more particularly, a bumper guard utilizing adjustable tabs.

Description of the Prior Art

Numerous innovations for bumper covers have been provided in the prior art that will be described. Even though these innovations may be suitable for the specific individual purposes to which they address, however, they differ from the present invention.

A FIRST EXAMPLE, U.S. Pat. No. 2,271,046, Published/Issued on Jan. 27, 1942, to Sing teaches a bumper guard formed of resilient material and adapted to extend transversely across the face of a bumper. The guard has flexible end portions adapted to overhang the respective upper and lower edges of the bumper, and tension apparatus for drawing the flexible end portions together to tightly hold the bumper guard upon a bumper. The flexible end portions have transverse journals for receiving the tension apparatus. The tension apparatus includes oppositely arranged threaded shank portions journaled within the journals. Further has a turnbuckle engaging the shank portions for drawing the same together. The shank portions are scored transversely adjacent their ends to provide portions to be broken off to decrease the length thereof without interfering with the threaded portions.

A SECOND EXAMPLE, U.S. Pat. No. 3,178,204, Published/Issued on Apr. 13, 1965, to Croft teaches detachable trailer hitch bumper clamps adapted to be universally installable on automotive rear bumpers of widely variant contours.

A THIRD EXAMPLE, U.S. Pat. No. 4,726,614, Published/Issued on Feb. 23, 1988, to Myers, et al. teaches a vehicle body panel protector bumper including semi-flexible and tubular members having base sides with magnets for mounting in a selected position on a body panel, with a lengthwise adjustable security tab for attachment to a door edge, and connected by a flexible hinge-connector strap for convenient mounting, dismounting, and storage.

A FOURTH EXAMPLE, U.S. Pat. No. 5,618,073, Published/Issued on Apr. 8, 1997, to Criscione teaches a protective cover for covering the outer surface of a rear bumper of a motor vehicle. The protective cover may include a single panel of flexible material, or alternatively, two panels of flexible material and a central portion formed from a transparent polymer that provides visual access to a rear license plate that may be located in a recess formed in the rear bumper. The protective cover is secured in place across the rear bumper by straps that are looped through attachment handles affixed to the motor vehicle's rear wheel.

A FIFTH EXAMPLE, U.S. Pat. No. 7,073,830, Published/Issued on Jul. 11, 2006, to Chen, et al. teaches a bumper protection device for automobile bumpers to shield the bumpers from impact, which attaches to the automobile by a fabric shroud that attaches around the hood and trunk latch and suspends an impact-resisting padded guard portion, adapted to the vehicle bumper, and covering the entire front or rear bumper. The padded guard portion is drawn partially around the sides of the bumper and anchored by at least one elastic strap attached to opposing ends of the bumper guard portion. Each elastic strap is further attached to the tires or wheel wells of the automobile retaining the bumper protection device over the entire rear bumper surface and around the sides of the bumper.

A SIXTH EXAMPLE, U.S. Patent Office Document No. D619,060, Published/Issued on Jul. 6, 2010, to Lorenzo teaches the ornamental design for an adjustable automobile bumper protector.

A SEVENTH EXAMPLE, U.S. Patent Office Document No. 2003/0034660, Published/Issued on Feb. 20, 2003, to Kelly teaches a portable cushion protector which is attachable to, and detachable from, the rear portions of an automobile, and which protects its rear bumper from scratches and other damage while it is parked. The cushion protector has supporting mechanisms that may be attached to the automobile trunk for holding the cushion securely in place upon the bumper.

AN EIGHTH EXAMPLE, U.S. Patent Office Document No. 2005/0242558, Published/Issued on Nov. 3, 2005, to Cohen teaches a bumper apron/protector that is a protective mat made from a variety of materials ranging from cloth to leather. Once it is attached in place in the trunk or rear cargo area of a vehicle, the unattached end can be grasped, pulled out of the vehicle's trunk/cargo space, and dropped down over the bumper where it serves two functions. First function, it protects the rear bumper from being nicked, scratched, or dinged as articles, such as, golf bags and golf clubs, are dropped or rubbed across the bumper as they are being placed into and out of the vehicle's trunk or cargo space area. Second function, it functions as a clean surface on which a person may sit when performing any function requiring a seated position, such as, changing from street shoes to golf shoes.

A NINTH EXAMPLE, U.S. Patent Office Document No. 2011/0198874, Published/Issued on Aug. 18, 2011, to Lee, et al. teaches a removable, padded, and vinyl panel to be fastened over the rear bumper of a vehicle to protect the bumper from scratches, dents, and dings. The bumper protector is produced in a tough, durable, and UV-resistant vinyl material, with an interior lining of impact-absorbing cellular synthetic foam. While the bumper protector is manufactured in a wide variety of lengths and widths, depending on the model of car, pickup, van, or SUV being fitted, the basic model is tapered, incorporating two side panels approximately three and one half feet in length and approximately five and one half inches in width, which extend to cover the sides of the bumper, and a longer and wider, approximately five and one half feet by approximately nine inch panel, covers the rear of the bumper. The bumper cover is equipped with a double-stitched flange, lip, or apron designed to slip under the vehicle's trunk-lid, which is closed in order to secure the bumper cover, and the side guard sections of the bumper cover fasten by means of hook and loop pile fasteners (VELCRO) equipped straps.

It is apparent now that numerous innovations for bumper covers have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a bumper guard utilizing adjustable tabs that avoids the disadvantages of the prior art.

ANOTHER OBJECT of the present invention is to provide a bumper guard utilizing adjustable tabs that is simple and inexpensive to manufacture.

STILL ANOTHER OBJECT of the present invention is to provide a bumper guard utilizing adjustable tabs that is simple to use.

BRIEFLY STATED, STILL YET ANOTHER OBJECT of the present invention is to provide a one-size fits-all protector that replaceably attaches to, overlies, and protects by being length adjustable, one of an any length front bumper cover of a vehicle and an any length rear bumper cover of the vehicle. The any length front bumper cover of the vehicle has a top and a pair of sides. The any length rear bumper cover of the vehicle has a top and a pair of sides. The vehicle has a grille, a pair of front wheel wells, a trunk, and a pair of rear wheel wells. The one-size fits-all protector includes a body and an attaching apparatus. The body overlies and protects by being length adjustable one of the any length front bumper cover of the vehicle and the any length rear bumper cover of the vehicle. The attaching apparatus is disposed on the body and replaceably attaches the body to the one of the any length front bumper cover of the vehicle and the any length rear bumper cover of the vehicle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE DRAWING

Introductory 20 one-size fits-all protector of embodiments of present invention for replaceably attaching to, overlying, and protecting by being length adjustable one of any length front bumper cover 22 of vehicle 24 and any length rear bumper cover 26 of vehicle 24
22 any length front bumper cover 22 of vehicle 24
24 vehicle
26 any length rear bumper cover 26 of vehicle 24
28 top of any length front bumper cover 22 of vehicle 24
30 pair of sides of any length front bumper cover 22 of vehicle 24
32 top of any length rear bumper cover 26 of vehicle 24
34 pair of sides of any length rear bumper cover 26 of vehicle 24
36 grille of vehicle 24
38 pair of front wheel wells of vehicle 24
40 trunk of vehicle 24
42 pair of rear wheel wells 42 of vehicle 24

Overall Configuration of One-Size Fits-All Protector 20

44 body for overlying and protecting by being length adjustable one of any length front bumper cover 22 of vehicle 24 and any length rear bumper cover 26 of vehicle 24
46 attaching apparatus for replaceably attaching body 44 to one of any length front bumper cover 22 of vehicle 24 and any length rear bumper cover 26 of vehicle 24

Overall Configuration of Body 44

48 bottom layer of body 44
49 top layer of body 44
50 pair of intermediate wing extensions of body 44 for overlying and protecting one of pair of sides 30 of any length front bumper cover 22 of vehicle and pair of sides 34 of any length rear bumper cover 26 of vehicle 24

56 convex ends of pair of intermediate wing extensions 50 of body 44

Specific Configuration of Bottom Layer 48 of Body 44

58 center part of bottom layer 48 of body 44
60 pair of side parts of bottom layer 48 of body 44
62 axial borders of pair of side parts 60 of bottom layer 48 of body 44
63 raised tracks of axial borders 62 of pair of side parts 60 of bottom layer 48 of body 44
64 flap of center part 58 of bottom layer 48 of body 44 for folding over one of top 28 of any length front bumper cover 22 of vehicle 24 and top 32 of any length rear bumper cover 26 of vehicle 24, and when folding over top 32 of any length rear bumper cover 26 of vehicle 24, extends into trunk 40 of vehicle 24
66 pair of through slots of flap 64 of center part 58 of bottom layer 48 of body 44

Specific Configuration of Pair of Intermediate Wing Extensions 50 of Body 44

68 proximal end of each intermediate wing extension of pair of intermediate wing extensions 50 of body 44
70 distal end of each intermediate wing extension of pair of intermediate wing extensions 50 of body 44
71 stop of distal end 70 of each intermediate wing extension of pair of intermediate wing extensions 50 of body 44
72 flexible tab of proximal end 68 of each intermediate wing extension of pair of intermediate wing extensions 50 of body 44
74 upright part of flexible tab 72 of proximal end 68 of each intermediate wing extension of pair of intermediate wing extensions 50 of body 44
76 transverse part of flexible tab 72 of proximal end 68 of each intermediate wing extension of pair of intermediate wing extensions 50 of body 44

Specific Configuration of Top Layer 49 of Body 44

78 center part of top layer 49 of body 44
80 pair of side parts of top layer 49 of body 44
82 through slot of each side part of pair of side parts 80 of top layer 49 of body 44
84 plurality of stops of each side part of pair of side parts 80 of top layer 49 of body 44

Specific Configuration of Attaching Apparatus 46

86 pair of attaching strip pieces of attaching apparatus 46 for replaceably engaging in one of pair of front wheel wells 38 of vehicle 24 when one-size fits-all protector 20 is attached to any length front bumper cover 22 of vehicle 24 and pair of rear wheel wells 42 of vehicle 24 when one-size fits-all protector 20 is attached to any length rear bumper cover 26 of vehicle 24
87 through bores of pair of attaching strip pieces 86 of attaching apparatus 46, respectively, for receiving bolts to maintain pair of attaching strip pieces 86 of attaching apparatus 46 in one of pair of front wheel wells 38 of vehicle 24, respectively, when one-size fits-all protector 20 is attached to any length front bumper cover 22 of vehicle 24 and pair of rear wheel wells 42 of vehicle 24, respectively, when one-size fits-all protector 20 is attached to any length rear bumper cover 26 of vehicle 24
88 core of each attaching strip piece of pair of attaching strip pieces 86 of attaching apparatus 46 for allowing pair of attaching strip pieces 86 of attaching apparatus 46 to bend into one of pair of front wheel wells 38 of vehicle 24 when one-size fits-all protector 20 is attached to any length front bumper cover 22 of vehicle 24 and pair of rear wheel wells 42 of vehicle 24 when one-size fits-all protector 20 is attached to any length rear bumper cover 26 of vehicle 24 and for allowing pair of attaching strip pieces 86 of attaching apparatus 46 to bend out of one of pair of front wheel wells 38 of vehicle 24 when one-size fits-all protector 20 is to be removed from any length front bumper cover 22 of vehicle 24 and pair of rear wheel wells 42 of vehicle 24 when one-size fits-all protector 20 is to be removed from any length rear bumper cover 26 of vehicle 24
90 coated skin of each attaching strip piece of pair of attaching strip pieces 86 of attaching apparatus 46 for preventing damage to one of any length front bumper cover 22 of vehicle 24 from core 88 of each attaching strip piece of pair of attaching strip pieces 86 of attaching apparatus 46 when one-size fits-all protector 20 is attached to any length front bumper cover 22 of vehicle 24 and any length rear bumper cover 26 of vehicle 24 from core 88 of each attaching strip piece of pair of attaching strip pieces 86 of attaching apparatus 46 when one-size fits-all protector 20 is attached to any length rear bumper cover 26 of vehicle 24
92 pair of length-adjustable straps of attaching apparatus 46
94 proximal end of each strap of pair of length-adjustable straps 92 of attaching apparatus 46
96 distal end of each strap of pair of length-adjustable straps 92 of attaching apparatus 46 for entering trunk 40 of vehicle 24 when one-size fits-all protector 20 is replaceably attached to any length rear bumper cover 26 of vehicle 24 and is for replaceably attaching to grille 36 of vehicle 24 when one-size fits-all protector 20 is replaceably attached to any length front bumper cover 22 of vehicle 24
98 adjuster ring of proximal end 88 of each strap of pair of length-adjustable straps 92 of attaching apparatus 46 for adjusting length of each strap of pair of length-adjustable straps 92 of attaching apparatus 46 so as to allow each strap of pair of length-adjustable straps 92 of attaching apparatus 46 to fit snugly along one of top 32 of any length rear bumper cover 26 of vehicle 24 when one-size fits-all protector 20 is replaceably attached to any length rear bumper cover 26 of vehicle 24 and top 28 of any length front bumper cover 22 of vehicle 24 when one-size fits-all protector 20 is replaceably attached to any length front bumper cover 22 of vehicle 24
100 flat hook of distal end 90 of each strap of pair of length-adjustable straps 92 of attaching apparatus 46 for engaging in trunk 40 of vehicle 24 when one-size fits-all protector 20 is replaceably attached to any length rear bumper cover 26 of vehicle 24 and is for replaceably attaching to grille 36 of vehicle 24 when one-size fits-all protector 20 is replaceably attached to any length front bumper cover 22 of vehicle 24
102 license plate mounting assembly of attaching apparatus 46 for mounting license plate of vehicle 24
104 through opening of center part 78 of top layer 49 of body 44 of license plate mounting assembly 102 of attaching apparatus 46
106 backing plate of license plate mounting assembly 102 of attaching apparatus 46 for replaceably holding license plate of vehicle 24

DETAILED DESCRIPTION OF THE PREFERRED EMBODIMENTS

Introductory

Figure 1:
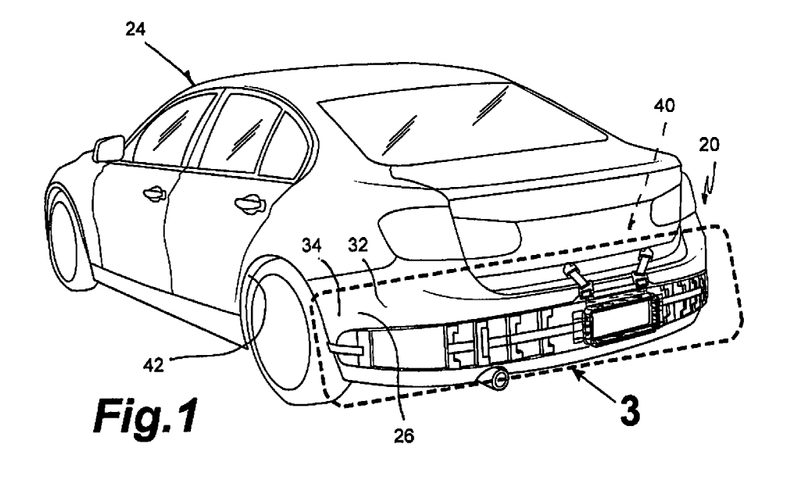
FIG. 1 is a diagrammatic perspective view of a vehicle illustrating an embodiment of the bumper guard utilizing adjustable tabs installed on a rear end thereof.
Figure 2:
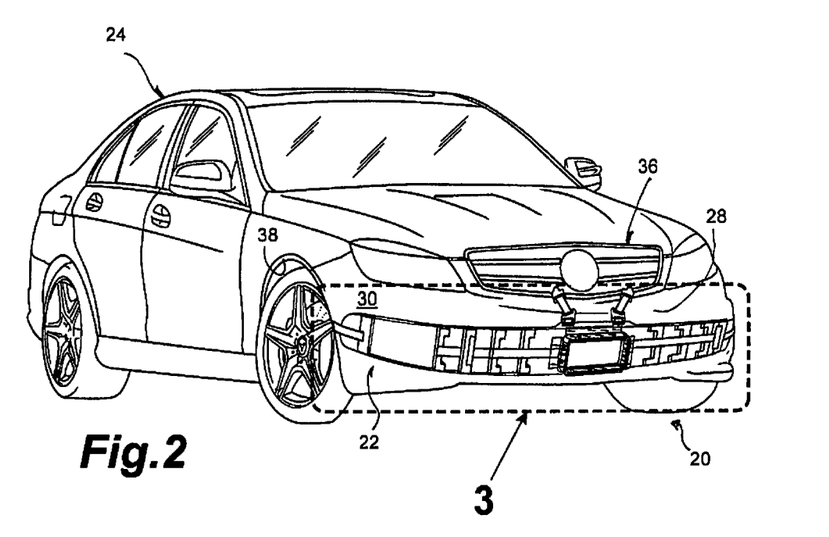
FIG. 2 is a diagrammatic perspective view of a vehicle illustrating an embodiment of the bumper guard utilizing adjustable tabs installed on a front end thereof.
Figure 3:
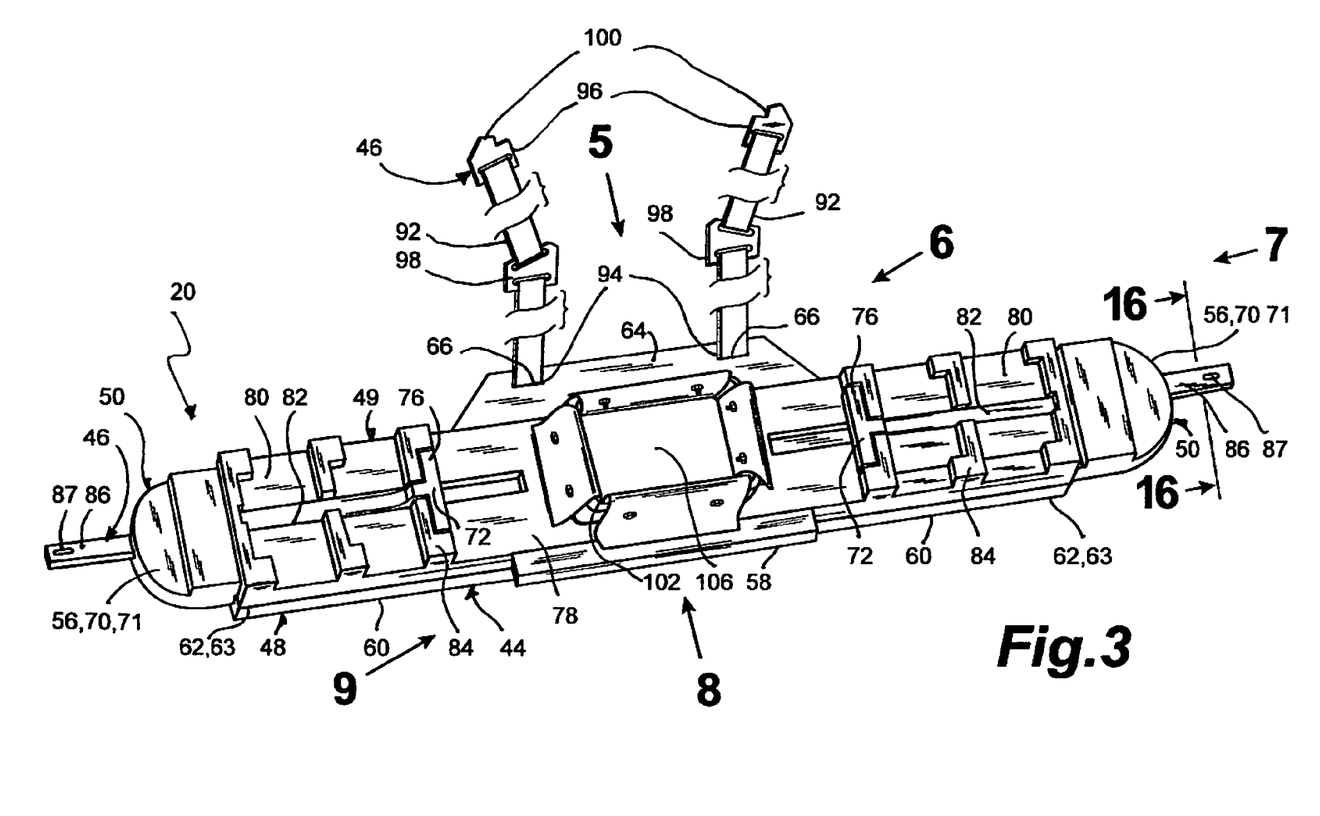
FIG. 3 is a diagrammatic perspective view of an embodiment of the bumper guard utilizing adjustable tabs per se shown enclosed in the dotted curves indicated by arrow 3 in FIGS. 1 and 2.
Figure 4:
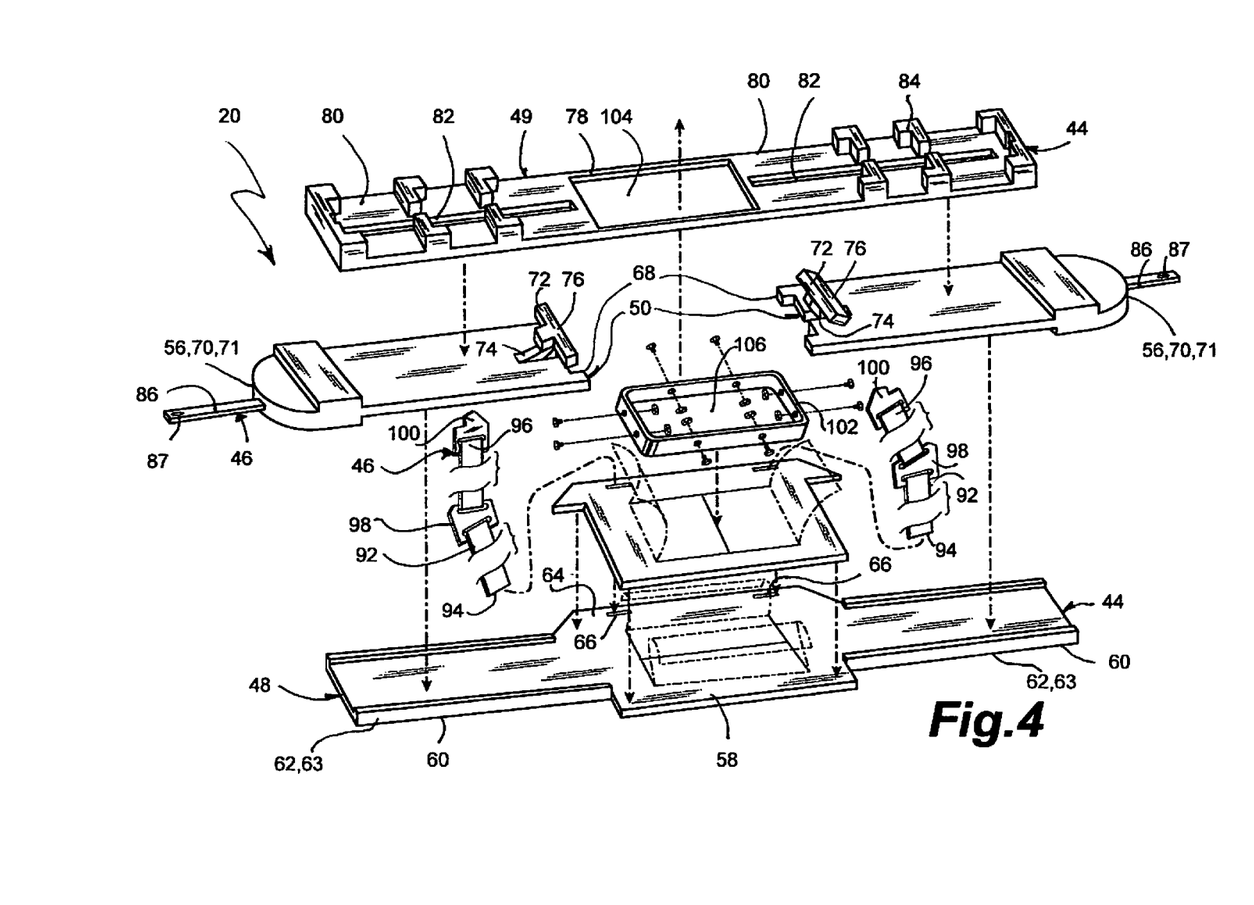
FIG. 4 is a diagrammatic exploded perspective assembly view thereof.
Figures 5, 6, 7:
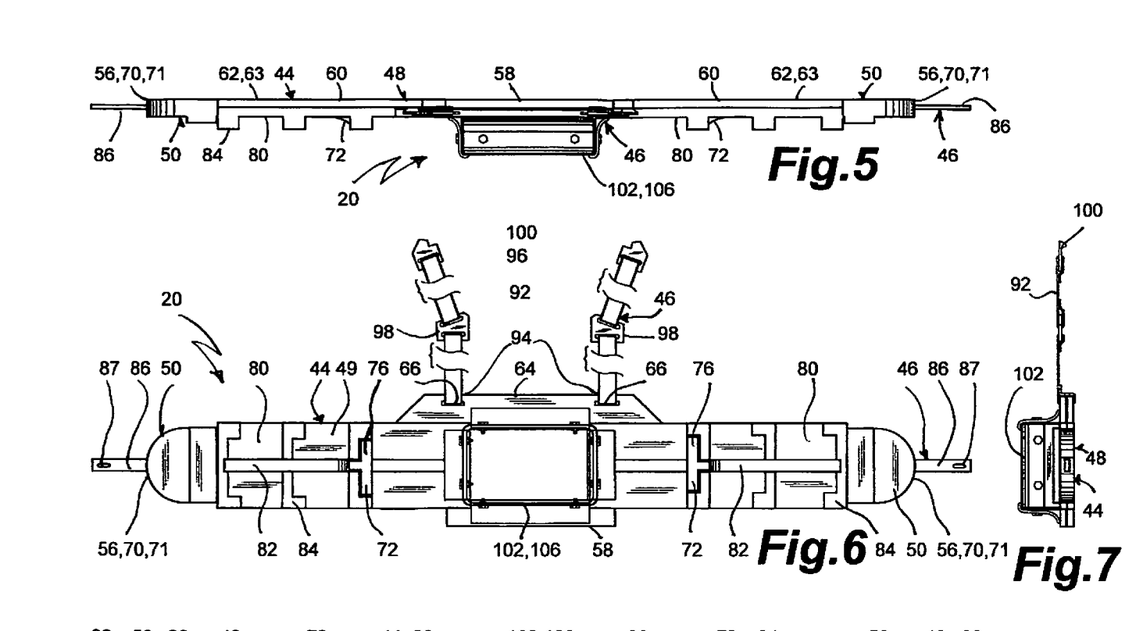
FIG. 5 is a top plan view thereof taken in the direction of arrow 5 in FIG. 3.
FIG. 6 is a front elevational view thereof taken in the direction of arrow 6 in FIG. 3.
FIG. 7 is a left side elevational view thereof taken in the direction of arrow 7 in FIG. 3.
Figure 8:
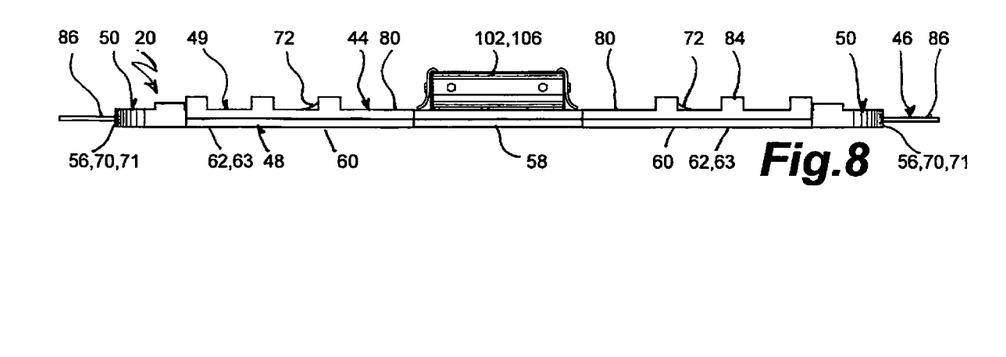
FIG. 8 is a bottom plan view thereof taken in the direction of arrow 8 in FIG. 3.
Figure 9:
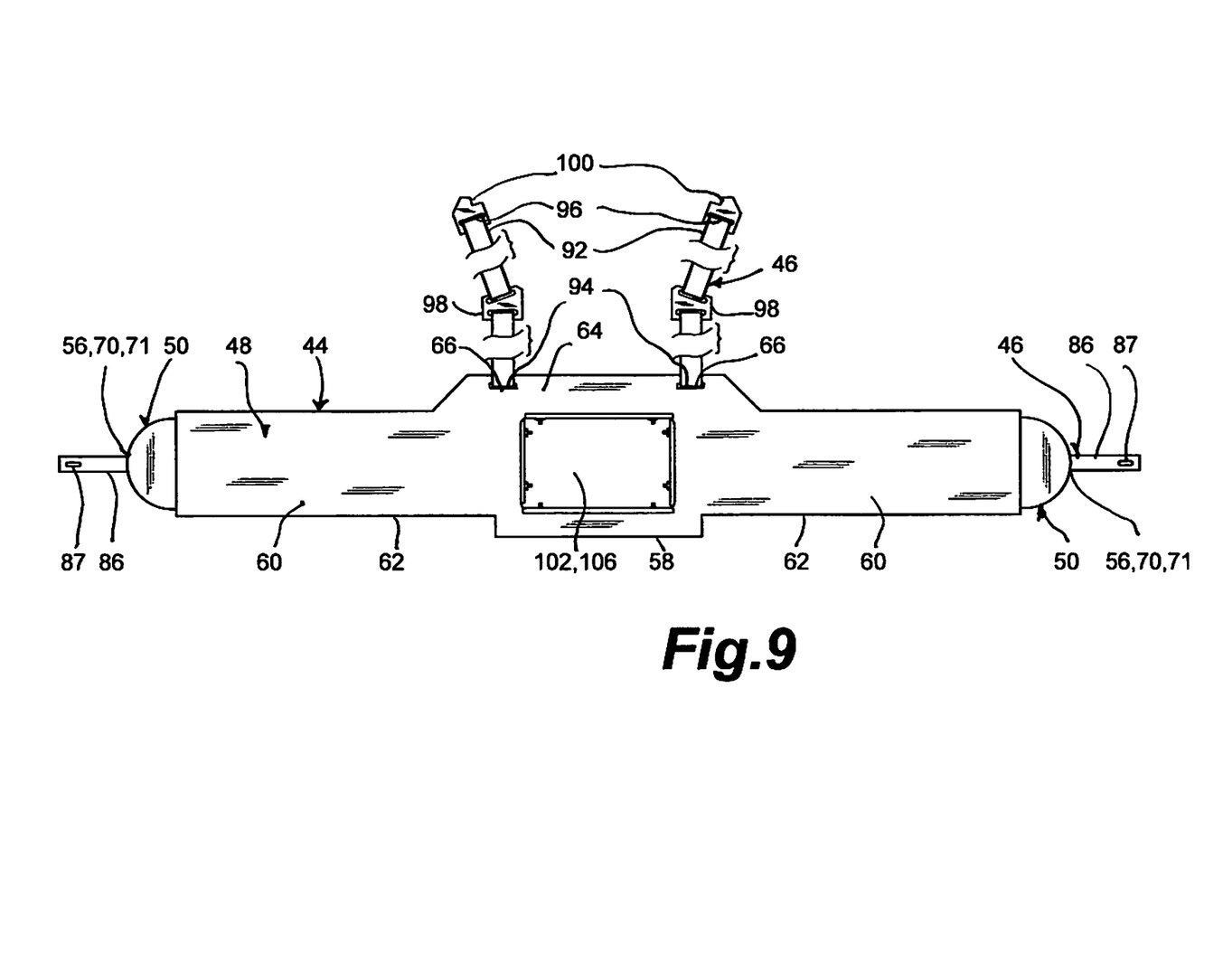
FIG. 9 is a rear elevational view thereof taken in the direction of arrow 9 in FIG. 3.
Figure 10:
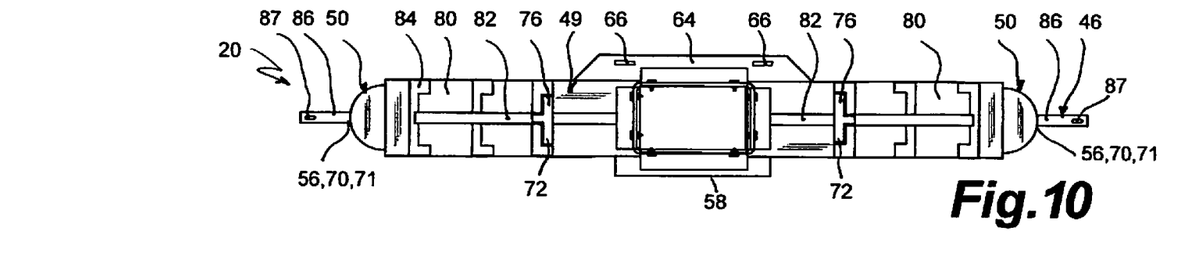
FIG. 10 is a diagrammatic front elevational view thereof, with parts omitted taken in the direction of arrow 6 in FIG. 3, showing the bumper guard adjusted to a shortest length.
Figure 11:
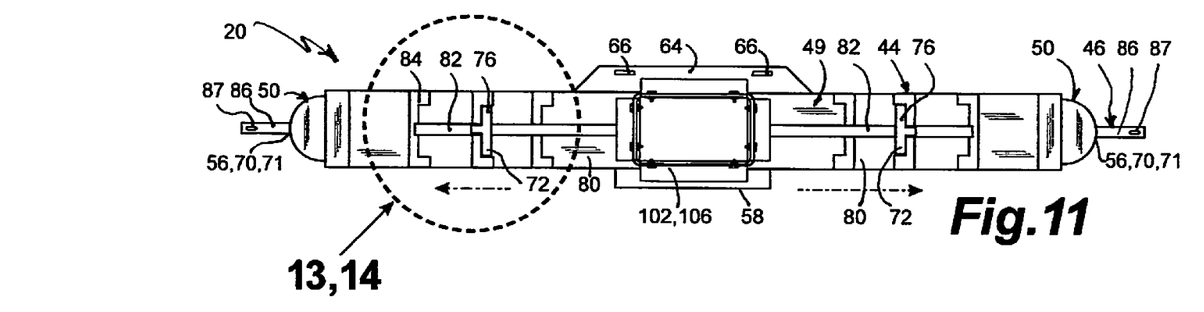
FIG. 11 is a diagrammatic front elevational view thereof, with parts omitted taken in the direction of arrow 6 in FIG. 3, showing the bumper guard adjusted to an intermediate length.
Figure 12:
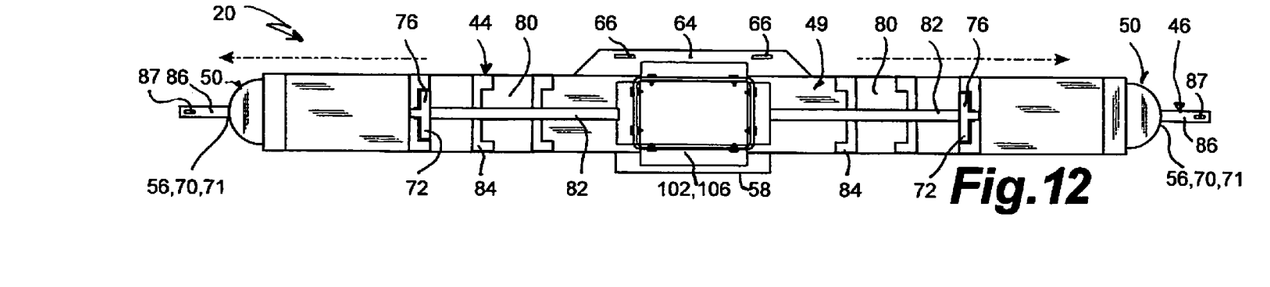
FIG. 12 is a diagrammatic front elevational view thereof, with parts omitted taken in the direction of arrow 6 in FIG. 3, showing the bumper guard adjusted to a longest length.

Referring now to the figures, in which like numerals indicate like parts, and particularly to FIGS. 1 and 2, the one-size fits-all protector of the embodiments of the present invention is shown generally at 20 for replaceably attaching to, overlying, and protecting by being length adjustable one of an any length front bumper cover 22 of a vehicle 24 (FIG. 2) and an any length rear bumper cover 26 of the vehicle 24 (FIG. 1), wherein the any length front bumper cover 22 of the vehicle 24 has a top 28 and a pair of sides 30, wherein the any length rear bumper cover 26 of the vehicle 24 has a top 32 and a pair of sides 34, and wherein the vehicle 24 has a grille 36 (FIG. 2), a pair of front wheel wells 38 (FIG. 2), a trunk 40 (FIG. 1), and a pair of rear wheel wells 42 (FIG. 1).

Overall Configuration of the One-Size Fits-All Protector 20

The overall configuration of the one-size fits-all protector 20 can best be seen in FIGS. 3-15, and as such, will be discussed with reference thereto.

The one-size fits-all protector 20 comprises a body 44 and an attaching apparatus 46. The body 44 is for overlying and protecting by being length adjustable the one of the any length front bumper cover 22 of the vehicle 24 and the any length rear bumper cover 26 of the vehicle 24. The attaching apparatus 46 is disposed on the body 44, and is for replaceably attaching the body 44 to the one of the any length front bumper cover 22 of the vehicle 24 and the any length rear bumper cover 26 of the vehicle 24.

Overall Configuration of the Body 44

The overall configuration of the body 44 can best be seen in FIGS. 3-15, and as such, will be discussed with reference thereto.

The body 44 comprises a bottom layer 48, a top layer 49, and a pair of intermediate wing extensions 50.

The pair of intermediate wing extensions 50 of the body 44 extend outwardly and length adjustably from the bottom layer 48 of the body 44 to convex ends 56, respectively, and are for overlying and protecting one of the pair of sides 30 of the any length front bumper cover 22 of the vehicle and the pair of sides 34 of the any length rear bumper cover 26 of the vehicle 24.

Specific Configuration of the Bottom Layer 48 of the Body 44

The specific configuration of the bottom layer 48 of the body 44 can best be seen in FIGS. 3-15, and as such, will be discussed with reference thereto.

The bottom layer 48 of the body 44 has a center part 58 and a pair of side parts 60.

The pair of side parts 60 of the bottom layer 48 of the body 44 extend outwardly from opposite sides of the center part 58 of the bottom layer 48 of the body 44, and have axial borders 62 that form raised tracks 63.

The bottom layer 48 of the body 44 is made from one of vinyl, rubber, and combinations thereof for conforming to a main portion of the one of the any length front bumper cover 22 of the vehicle 24 and the any length rear bumper cover 26 of the vehicle 24.

The bottom layer 48 of the body 44 further has a flap 64.

The flap 64 of the bottom layer 48 of the body 44 extends upwardly from the center part 58 of the bottom layer 48 of the body 44, is generally trapezoid-shaped, and is for folding over one of the top 28 of the any length front bumper cover 22 of the vehicle 24 and the top 32 of the any length rear bumper cover 26 of the vehicle 24, and when folding over the top 32 of the any length rear bumper cover 26 of the vehicle 24, extends into the trunk 40 of the vehicle 24.

The flap 64 of the bottom layer 48 of the body 44 has a pair of through slots 66.

The pair of through slots 66 of the flap 64 of the bottom layer 48 of the body 44 are axially spaced-apart from each other.

Specific Configuration of the Pair of Intermediate Wing Extensions 50 of the Body 44

The specific configuration of the pair of intermediate wing extensions 50 of the body 44 can best be seen in FIGS. 3-15, and as such, will be discussed with reference thereto.

The pair of intermediate wing extensions 50 of the body 44 slide in and out of the pair of side parts 60 of the bottom layer 48 of the body 44, respectively, via the raised tracks 63 of the axial borders 62 of the pair of side parts 60 of the bottom layer 48 of the body 44 so as to allow the one-size fits-all protector 20 to be length adjustable for length adjusting to the one of the any length front bumper cover 22 of the vehicle 24 and the any length rear bumper cover 26 of the vehicle 24.

Each of the pair of intermediate wing extensions 50 of the body 44 has a proximal end 68 and a distal end 70.

The distal end 70 of each of the pair intermediate wing extensions 50 of the body 44 is the convex end 56 of an associated intermediate wing extension 50 of the body 44, and is raised to provide a stop 71.

The stop 71 of the distal end 70 of each of the pair intermediate wing extensions 50 of the body 44 limits how far the pair of intermediate wing extensions 50 of the body 44 slide inwardly in the raised tracks 63 of the axial borders 62 of the pair of side parts 60 of the bottom layer 48 of the body 44, respectively.

The proximal end 68 of each of the pair of intermediate wing extensions 50 of the body 44 has a flexible tab 72.

The flexible tab 72 of the proximal end 68 of each of the pair of intermediate wing extensions 50 of the body 44 is generally T-shaped, and as such, has an upright part 74 and a transverse part 76.

The upright part 74 of the flexible tab 72 of the proximal end 68 of each intermediate wing extension 50 of the body 44 extends upwardly therefrom.

Specific Configuration of the Top Layer 49 of the Body 44

The specific configuration of the top layer 49 of the body 44 can best be seen in FIGS. 3-15, and as such, will be discussed with reference thereto.

The top layer 49 of the body 44 has a center part 78 and a pair of side parts 80.

The pair of side parts 80 of the top layer 49 of the body 44 extend outwardly from opposite sides of the center part 78 of the top layer 49 of the body 44, respectively.

The top layer 49 of the body 44 is made from one of vinyl, rubber, and combinations thereof.

Each side part 80 of the top layer 49 of the body 44 has a through slot 82.

The through slot 82 of each side part 80 of the top layer 49 of the body 44 is axially disposed and extends centrally therealong.

Each side part 80 of the top layer 49 of the body 44 further has a plurality of stops 84.

The plurality of stops 84 of each side part 80 of the top layer 49 of the body 44 are laterally disposed, are parallel to each other, are spaced axially apart from each other, are generally U-shaped in plan view, and open towards the center part 78 of the top layer 49 of the body 44.

The through slot 82 of each side part 80 of the top layer 49 of the body 44 movingly receives the flexible tab 72 of the proximal end 68 of an associated intermediate wing extension 50 of the body 44 so as to allow the pair of intermediate wing extensions 50 of the body 44 to slide in and out relative to the top layer 49 of the body 44.

When the pair of intermediate wing extensions 50 of the body 44 reach a desired length, the transverse part 76 of the flexible tab 72 of the proximal end 68 of the pair of intermediate wing extensions 50 of the body 44 snaps into an associated stop 84 of an associated side part 80 of the top layer 49 of the body 44, thereby replaceably locking the pair of intermediate wing extensions 50 of the body 44 at the desired length for fitting the one of the any length front bumper cover 22 of the vehicle 24 and the any length rear bumper cover 26 of the vehicle 24.

Specific Configuration of the Attaching Apparatus 46

The specific configuration of the attaching apparatus 46 can best be seen in FIGS. 3-17, and as such, will be discussed with reference thereto.

The attaching apparatus 46 comprises a pair of attaching strip pieces 86.

The pair of attaching strip pieces 86 of the attaching apparatus 46 extend axially from the convex ends 56 of the intermediate wing extensions 50 of the body 44, respectively, are slender and elongated, and are for replaceably engaging in one of the pair of front wheel wells 38 of the vehicle 24 when the one-size fits-all protector 20 is attached to the any length front bumper cover 22 of the vehicle 24 and the pair of rear wheel wells 42 of the vehicle 24 when the one-size fits-all protector 20 is attached to the any length rear bumper cover 26 of the vehicle 24.

The pair of attaching strip pieces 86 of the attaching apparatus 46 terminate in through bores 87, respectively. The through bores 87 of the pair of attaching strip pieces 86 of the attaching apparatus 46, respectively, are for receiving bolts to maintain the pair of attaching strip pieces 86 of the attaching apparatus 46 in one of the pair of front wheel wells 38 of the vehicle 24 when the one-size fits-all protector 20 is attached to the any length front bumper cover 22 of the vehicle 24 and the pair of rear wheel wells 42 of the vehicle 24 when the one-size fits-all protector 20 is attached to the any length rear bumper cover 26 of the vehicle 24.

Figures 13, 14, 15, 16:
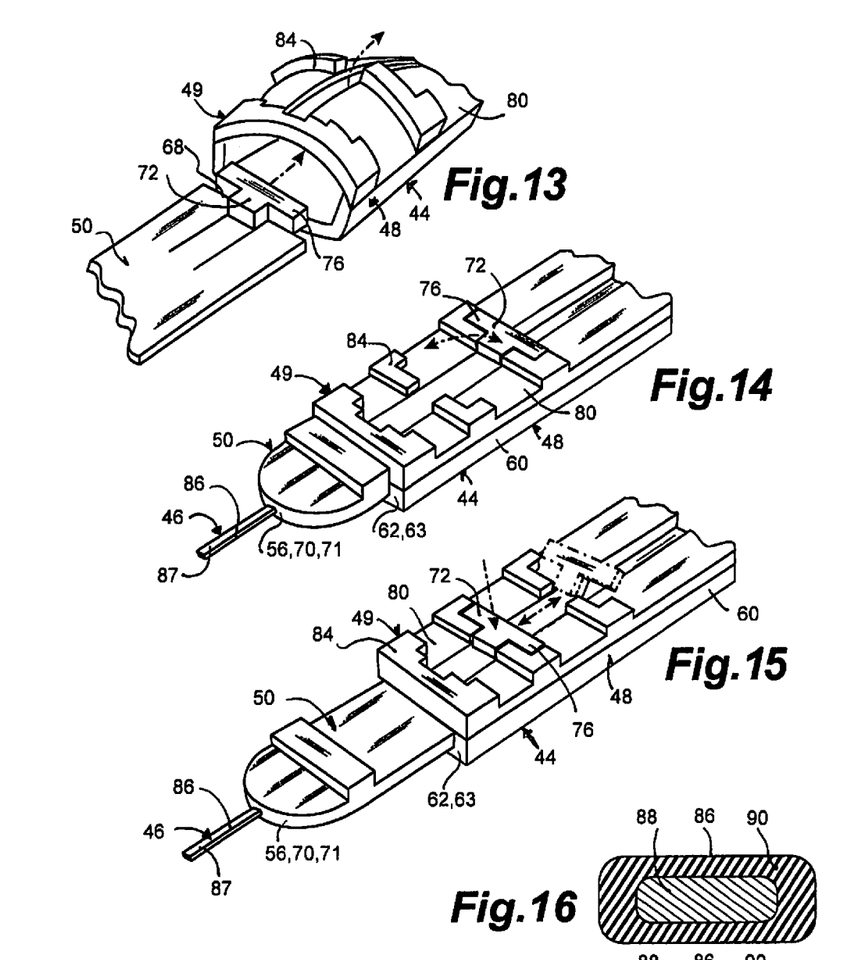
FIG. 13 is a diagrammatic perspective view, with parts broken away, showing a tab component being installed into a housing component.
FIG. 14 is a diagrammatic perspective view, with parts broken away, showing a tab component locked in place in the housing component.
FIG. 15 is a diagrammatic perspective view, with parts broken away, showing a tab component in a lifted position so as to permit adjustment of the length of the bumper guard.
FIG. 16 is a cross sectional view taken on line 16-16 in FIG. 3 showing the construction of a semi rigid securement component and FIG. 17 is a cross sectional view taken on line 16-16 in FIG. 3 showing the construction of another embodiment of a semi rigid securement component.
Figure 17:
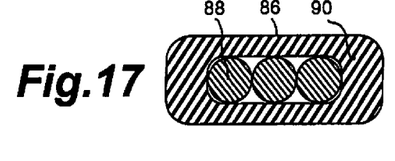

As shown in FIGS. 16 and 17, each attaching strip piece 86 of the attaching apparatus 46 comprises a core 88 covered with a coated skin 90.

The core 88 of each attaching strip piece 86 of the attaching apparatus 46 is a flexible and non-memory material for allowing the pair of attaching strip pieces 86 of the attaching apparatus 46 to bend into the one of the pair of front wheel wells 38 of the vehicle 24 when the one-size fits-all protector 20 is attached to the any length front bumper cover 22 of the vehicle 24 and the pair of rear wheel wells 42 of the vehicle 24 when the one-size fits-all protector 20 is attached to the any length rear bumper cover 26 of the vehicle 24 and for allowing the pair of attaching strip pieces 86 of the attaching apparatus 46 to bend out of the one of the pair of front wheel wells 38 of the vehicle 24 when the one-size fits-all protector 20 is to be removed from the any length front bumper cover 22 of the vehicle 24 and the pair of rear wheel wells 42 of the vehicle 24 when the one-size fits-all protector 20 is to be removed from the any length rear bumper cover 26 of the vehicle 24.

The flexible and non-memory material of the core 88 of each attaching strip piece 86 of the attaching apparatus 46 is made from a metal.

The metal of the flexible and non-memory material of the core 88 of each attaching strip piece 86 of the attaching apparatus 46 is one of aluminum, copper, and combinations thereof.

The coated skin 90 of each attaching strip piece 86 of the attaching apparatus 46 is made from one of vinyl, rubber, and combinations thereof for preventing damage to one of the any length front bumper cover 22 of the vehicle 24 from the core 88 of each attaching strip piece 86 of the attaching apparatus 46 when the one-size fits-all protector 20 is attached to the any length front bumper cover 22 of the vehicle 24 and the any length rear bumper cover 26 of the vehicle 24 from the core 88 of each attaching strip piece 86 of the attaching apparatus 46 when the one-size fits-all protector 20 is attached to the any length rear bumper cover 26 of the vehicle 24.

As shown in FIGS. 16 and 17, the core 88 of each attaching strip piece 86 of the attaching apparatus 46 is made from one of one-piece and multiple adjacent pieces depending upon desired flexibility characteristics of the two attaching strip pieces 86 of the attaching apparatus 46.

The attaching apparatus 46 further comprises a pair of length-adjustable straps 92.

Each length-adjustable strap 92 of the attaching apparatus 46 includes a proximal end 94, a distal end 96, and a length.

The distal end 96 of each length-adjustable strap 92 of the attaching apparatus 46 is for one of entering the trunk 40 of the vehicle 24 when the one-size fits-all protector 20 is replaceably attached to the any length rear bumper cover 26 of the vehicle 24 and for replaceably attaching to the grille 36 of the vehicle 24 when the one-size fits-all protector 20 is replaceably attached to the any length front bumper cover 22 of the vehicle 24.

The proximal end 88 of each length-adjustable strap 92 of the attaching apparatus 46 passes through an associated through slot 66 of the flap 64 of the body 44, and is maintained thereat, by an adjuster ring 98. The adjuster ring 98 of the proximal end 88 of each length-adjustable strap 86 of the attaching apparatus 46 is for adjusting the length of each length-adjustable strap 92 of the attaching apparatus 46 so as to allow each length-adjustable strap 92 of the attaching apparatus 46 to fit snugly along one of the top 32 of the any length rear bumper cover 26 of the vehicle 24 when the one-size fits-all protector 20 is replaceably attached to the any length rear bumper cover 26 of the vehicle 24 and the top 28 of the any length front bumper cover 22 of the vehicle 24 when the one-size fits-all protector 20 is replaceably attached to the any length front bumper cover 22 of the vehicle 24.

The distal end 90 of each length-adjustable strap 92 of the attaching apparatus 46 has a flat hook 100 thereon. The flat hook 100 of the distal end 90 of each length-adjustable strap 92 of the attaching apparatus 46 is for one of engaging in the trunk 40 of the vehicle 24 when the one-size fits-all protector 20 is replaceably attached to the any length rear bumper cover 26 of the vehicle 24 and for replaceably attaching to the grille 36 of the vehicle 24 when the one-size fits-all protector 20 is replaceably attached to the any length front bumper cover 22 of the vehicle 24.

The attaching apparatus 46 further comprises a license plate mounting assembly 102. The license plate mounting assembly 102 of the attaching apparatus 46 is for mounting a license plate of the vehicle 24.

The license plate mounting assembly 102 of the attaching apparatus 46 includes the center part 78 of the top layer 49 of the body 44 having a through opening 104.

The license plate mounting assembly 102 of the attaching apparatus 46 further includes a backing plate 106. The backing plate 106 of the license plate mounting assembly 102 of the attaching apparatus 46 indirectly attaches to the center part 58 of the bottom layer 48 of the body 44, passes through the through opening 104 of the center part 78 of the top layer 49 of the body 44, and is for replaceably holding the license plate of the vehicle 24.

Impressions

It will be understood that each of the elements described above, or two or more together, may also find a useful application in other types of constructions differing from the types described above.

While the invention has been illustrated and described as embodiments of a bumper guard utilizing adjustable tabs, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A one-size fits-all protector for replaceably attaching to, overlying, and protecting by being length adjustable one of an any length front bumper cover of a vehicle and an any length rear bumper cover of the vehicle,
wherein the any length front bumper cover of the vehicle has:
i) a top; and
ii) a pair of sides,
wherein the any length rear bumper cover of said vehicle has:
i) a top; and
ii) a pair of sides, and
wherein the vehicle has:
i) a grille;
ii) a pair of front wheel wells;
iii) a trunk; and
iv) a pair of rear wheel wells, and
wherein said one-size fits-all protector, comprising:
a) a body; and
b) an attaching apparatus;
wherein said body is for overlying and protecting by being length adjustable one of the any length front bumper cover of the vehicle and the any length rear bumper cover of the vehicle;
wherein said attaching apparatus is disposed on said body; and
wherein said attaching apparatus is for replaceably attaching said body to the one of the any length front bumper cover of the vehicle and the any length rear bumper cover of the vehicle;
wherein said body comprises a bottom layer;
wherein said body comprises a top layer;
wherein said body comprises a pair of intermediate wing extensions;
wherein said pair of intermediate wing extensions of said body extend length adjustably from said bottom layer of said body to convex end, respectively.

2. The one-size fits-all protector of claim 1, wherein said pair of intermediate wing extensions of said body extend outwardly from said bottom layer of said body, respectively; and
wherein said pair of intermediate wing extensions of said body are for overlying and protecting one of the pair of sides of the any length front bumper cover of the vehicle and the pair of sides of the any length rear bumper cover of the vehicle.

3. The one-size fits-all protector of claim 1, wherein said bottom layer of said body has a center part.

4. The one-size fits-all protector of claim 3, wherein said bottom layer of said body has a pair of side parts.

5. The one-size fits-all protector of claim 3, wherein said bottom layer of said body comprises a flap;
wherein said flap of said bottom layer of said body is for folding over one of the top of the any length front bumper cover of the vehicle and the top of the any length rear bumper cover of said vehicle; and
wherein when said flap of said bottom layer of said body folds over the top of the any length rear bumper cover of the vehicle, said flap of said bottom layer of said body extends into the trunk of the vehicle.

6. The one-size fits-all protector of claim 5, wherein said flap of said bottom layer of said body extends upwardly from said center part of said bottom layer of said body.

7. The one-size fits-all protector of claim 5, wherein said flap of said bottom layer of said body is generally trapezoid-shaped.

8. The one-size fits-all protector of claim 5, wherein said flap of said bottom layer of said body has a pair of through slots.

9. The one-size fits-all protector of claim 8, wherein said pair of through slots of said flap of said bottom layer of said body are axially spaced-apart from each other.

10. The one-size fits-all protector of claim 4, wherein said pair of side parts of said bottom layer of said body extend outwardly from opposite sides of said center part of said bottom layer of said body.

11. The one-size fits-all protector of claim 4, wherein said pair of side parts of said bottom layer of said body have axial borders; and
wherein said axial borders of said pair of side parts of said bottom layer of said body form raised tracks, respectively.

12. The one-size fits-all protector of claim 4, wherein said pair of intermediate wing extensions of said body slide in and out of said pair of side parts of said bottom layer of said body, respectively, so as to allow said one-size fits-all protector to be length adjustable for length adjusting to the one of the any length front bumper cover of the vehicle and the any length rear bumper cover of the vehicle.

13. The one-size fits-all protector of claim 11, wherein said pair of intermediate wing extensions of said body slide in and out of said pair of side parts of said bottom layer of said body, respectively, via said raised tracks of said axial borders of said pair of side parts of said bottom layer of said body.

14. The one-size fits-all protector of claim 11, wherein each of said pair of intermediate wing extensions of said body has a distal end.

15. The one-size fits-all protector of claim 14, wherein said distal end of each of said pair intermediate wing extensions of said body is said convex end of an associated intermediate wing extension of said body.

16. The one-size fits-all protector of claim 14, wherein said distal end of each of said pair intermediate wing extensions of said body is raised to provide a stop; and
wherein said stop of said distal end of each of said pair intermediate wing extensions of said body limits how far said pair intermediate wing extensions of said body slide inwardly in said raised tracks of said axial borders of said pair of side parts of said bottom layer of said body, respectively.

17. The one-size fits-all protector of claim 1, wherein said bottom layer of said body is made from vinyl for conforming to the one of the any length front bumper cover of the vehicle and the any length rear bumper cover of the vehicle.

18. The one-size fits-all protector of claim 1, wherein said bottom layer of said body is made from rubber for conforming to the one of the any length front bumper cover of the vehicle and the any length rear bumper cover of the vehicle.

19. The one-size fits-all protector of claim 1, wherein said bottom layer of said body is made from combinations of vinyl and rubber for conforming to the one of the any length front bumper cover of the vehicle and the any length rear bumper cover of the vehicle.

20. The one-size fits-all protector of claim 1, wherein each of said pair of intermediate wing extensions of said body has a proximal end.

21. The one-size fits-all protector of claim 20, wherein said proximal end of each of said pair of intermediate wing extensions of said body is a flexible tab.

22. The one-size fits-all protector of claim 21, wherein said flexible tab of said proximal end of each of said pair of intermediate wing extensions of said body is generally T-shaped.

23. The one-size fits-all protector of claim 21, wherein said flexible tab of said proximal end of each of said pair of intermediate wing extensions of said body has an upright part.

24. The one-size fits-all protector of claim 21, wherein said flexible tab of said proximal end of each of said pair of intermediate wing extensions of said body has a transverse part.

25. The one-size fits-all protector of claim 23, wherein said upright part of said flexible tab of said proximal end of each intermediate wing extension of said body extends upwardly therefrom.

26. The one-size fits-all protector of claim 24, wherein said top layer of said body has a center part.

27. The one-size fits-all protector of claim 26, wherein said top layer of said body has a pair of side parts.

28. The one-size fits-all protector of claim 27, wherein said pair of side parts of said top layer of said body extend from said center part of said top layer of said body.

29. The one-size fits-all protector of claim 27, wherein said pair of side parts of said top layer of said body extend outwardly from opposite sides of said center part of said top layer of said body, respectively.

30. The one-size fits-all protector of claim 1, wherein said top layer of said body is made from vinyl.

31. The one-size fits-all protector of claim 1, wherein said top layer of said body is made from rubber.

32. The one-size fits-all protector of claim 1, wherein said top layer of said body is made from combinations of vinyl and rubber.

33. The one-size fits-all protector of claim 27, wherein each side part of said top layer of said body has a through slot.

34. The one-size fits-all protector of claim 33, wherein said through slot of each side part of said top layer of said body is axially disposed.

35. The one-size fits-all protector of claim 33, wherein said through slot of each side part of said top layer of said body extends centrally therealong.

36. The one-size fits-all protector of claim 27, wherein each side part of said top layer of said body has a plurality of stops.

37. The one-size fits-all protector of claim 36, wherein said plurality of stops of each side part of said top layer of said body are laterally disposed.

38. The one-size fits-all protector of claim 36, wherein said plurality of stops of each side part of said top layer of said body are parallel to each other.

39. The one-size fits-all protector of claim 36, wherein said plurality of stops of each side part of said top layer of said body are spaced axially apart.

40. The one-size fits-all protector of claim 36, wherein said plurality of stops of each side part of said top layer of said body are generally U-shaped in plan view.

41. The one-size fits-all protector of claim 36, wherein said plurality of stops of each side part of said top layer of said body open towards said center part of said top layer of said body.

42. The one-size fits-all protector of claim 33, wherein said through slot of each side part of said top layer of said body movingly receives said flexible tab of said proximal end of an associated intermediate wing extension of said body so as to allow said pair of intermediate wing extensions of said body to slide in and out relative to said top layer of said body.

43. The one-size fits-all protector of claim 36, wherein when said pair of intermediate wing extensions of said body reach a desired length for fitting one of the any length front bumper cover of the vehicle and the any length rear bumper cover of the vehicle, said transverse part of said flexible tab of said proximal end of said pair of intermediate wing extensions of said body snaps into an associated stop of an associated side part of said top layer of said body, thereby replaceably locking said pair of intermediate wing extensions of said body at the desired length.

44. The one-size fits-all protector of claim 1, wherein said attaching apparatus comprises a pair of attaching strip pieces; and
wherein said pair of attaching strip pieces of said attaching apparatus are for replaceably engaging in one of the pair of front wheel wells of the vehicle when said one-size fits-all protector is attached to the any length front bumper cover of the vehicle and the pair of rear wheel wells of the vehicle when said one-size fits-all protector is attached to the rear any length bumper cover of the vehicle.

45. The one-size fits-all protector of claim 44, wherein said pair of attaching strip pieces of said attaching apparatus extend axially from said convex ends of said pair of intermediate wing extensions of said body, respectively.

46. The one-size fits-all protector of claim 44, wherein said pair of attaching strip pieces of said attaching apparatus are slender.

47. The one-size fits-all protector of claim 44, wherein said pair of attaching strip pieces of said attaching apparatus are elongated.

48. The one-size fits-all protector of claim 44, wherein said pair of attaching strip pieces of said attaching apparatus terminate in through bores, respectively; and
wherein said through bores of said pair of attaching strip pieces of said attaching apparatus are for receiving bolts, respectively, to maintain said pair of attaching strip pieces of said attaching apparatus in one of the pair of front wheel wells of the vehicle when said one-size fits-all protector is attached to the any length front bumper cover of the vehicle and the pair of rear wheel wells of the vehicle when said one-size fits-all protector is attached to the any length rear bumper cover of the vehicle.

49. The one-size fits-all protector of claim 44, wherein each attaching strip piece of said attaching apparatus comprises a core.

50. The one-size fits-all protector of claim 49, wherein said core of each attaching strip piece of said attaching apparatus is covered with a coated skin.

51. The one-size fits-all protector of claim 49, wherein said core of each attaching strip piece of said attaching apparatus is a flexible and non-memory material for allowing said pair of attaching strip pieces of said attaching apparatus to bend into one of the pair of front wheel wells of the vehicle when said one-size fits-all protector is attached to the any length front bumper cover of the vehicle and the pair of rear wheel wells of the vehicle when said one-size fits all protector is attached to the any length rear bumper cover of the vehicle and for allowing said pair of attaching strip pieces of said attaching apparatus to bend out of the one of the pair of front wheel wells of the vehicle when said one-size fits-all protector is to be removed from the any length front bumper cover of the vehicle and the pair of rear wheel wells of the vehicle when said one-size fits-all protector is to be removed from the any length rear bumper cover of the vehicle.

52. The one-size fits-all protector of claim 51, wherein said flexible and non-memory material of said core of each attaching strip piece of said attaching apparatus is made from a metal.

53. The one-size fits-all protector of claim 51, wherein said flexible and non-memory material of said core of each attaching strip piece of said attaching apparatus is made from aluminum.

54. The one-size fits-all protector of claim 51, wherein said flexible and non-memory material of said core of each attaching strip piece of said attaching apparatus is made from copper.

55. The one-size fits-all protector of claim 51, wherein said flexible and non-memory material of said core of each attaching strip piece of said attaching apparatus is made from combinations of aluminum and copper.

56. The one-size fits-all protector of claim 50, wherein said coated skin of each attaching strip piece of said attaching apparatus is made from vinyl for preventing damage to one of the any length front bumper cover of the vehicle from said core of an associated attaching strip piece of said attaching apparatus when said one-size fits-all protector is attached to the any length front bumper cover of the vehicle and the any length rear bumper cover of the vehicle from said core of an associated attaching strip piece of said attaching apparatus when said one-size fits-all protector is attached to the any length rear bumper cover of the vehicle.

57. The one-size fits-all protector of claim 50, wherein said coated skin of each attaching strip piece of said attaching apparatus is made from rubber for preventing damage to one of the any length front bumper cover of the vehicle from said core of an associated attaching strip piece of said attaching apparatus when said one-size fits-all protector is attached to the any length front bumper cover of the vehicle and the any length rear bumper cover of the vehicle from said core of an associated attaching strip piece of said attaching apparatus when said one-size fits-all protector is attached to the any length rear bumper cover of the vehicle.

58. The one-size fits-all protector of claim 50, wherein said coated skin of each attaching strip piece of said attaching apparatus is made from combinations of said vinyl and said rubber for preventing damage to one of the any length front bumper cover of the vehicle from said core of an associated attaching strip piece of said attaching apparatus when said one-size fits-all protector is attached to the any length front bumper cover of the vehicle and the any length rear bumper cover of the vehicle from said core of an associated attaching strip piece of said attaching apparatus when said one-size fits-all protector is attached to the any length rear bumper cover of the vehicle.

59. The one-size fits-all protector of claim 49, wherein said core of each attaching strip piece of said attaching apparatus is made from one-piece.

60. The one-size fits-all protector of claim 49, wherein said core of each attaching strip piece of said attaching apparatus is made from multiple adjacent pieces.

61. The one-size fits-all protector of claim 5, wherein said attaching apparatus comprises a pair of length-adjustable straps.

62. The one-size fits-all protector of claim 61, wherein each length-adjustable strap of said attaching apparatus includes a proximal end.

63. The one-size fits-all protector of claim 61, wherein each length-adjustable strap of said attaching apparatus includes a distal end; and
wherein said distal end of each length-adjustable strap of said attaching apparatus is for one of entering the trunk of the vehicle when said one-size fits-all protector is replaceably attached to the any length rear bumper cover of said vehicle and for replaceably attaching to the grille of the vehicle when said one-size fits-all protector is replaceably attached to the any length front bumper cover of the vehicle.

64. The one-size fits-all protector of claim 61, wherein each length-adjustable strap of said attaching apparatus includes a length.

65. The one-size fits-all protector of claim 62, wherein said proximal end of each length-adjustable strap of said attaching apparatus passes through an associated through slot of said flap of said body.

66. The one-size fits-all protector of claim 62, wherein said proximal end of each length-adjustable strap of said attaching apparatus passes through an associated through slot of said flap of said body, and is maintained thereat, by an adjuster ring; and
wherein said adjuster ring of said proximal end of each length-adjustable strap of said attaching apparatus is for adjusting the length of each length-adjustable strap of said attaching apparatus so as to allow each length-adjustable strap of said attaching apparatus to fit snugly along one of the top of the any length rear bumper cover of the vehicle when said one-size fits-all protector is replaceably attached to the any length rear bumper cover of the vehicle and the top of the any length front bumper cover of the vehicle when said one-size fits-all protector is replaceably attached to the any length front bumper cover of the vehicle.

67. The one-size fits-all protector of claim 63, wherein said distal end of each length-adjustable strap of said attaching apparatus has a flat hook thereon; and
wherein said flat hook of said distal end of each length-adjustable strap of said attaching apparatus is for one of engaging in the trunk of the vehicle when said one-size fits-all protector is replaceably attached to the any length rear bumper cover of the vehicle and for replaceably attaching to the grille of the vehicle when said one-size fits-all protector is replaceably attached to the any length front bumper cover of the vehicle.

68. The one-size fits-all protector of claim 26, wherein said attaching apparatus comprises a license plate mounting assembly; and
wherein said license plate mounting assembly of said attaching apparatus is for mounting a license plate of the vehicle.

69. The one-size fits-all protector of claim 68, wherein said license plate mounting assembly of said attaching apparatus includes said center part of said top layer of said body having a through opening.

70. The one-size fits-all protector of claim 69, wherein said license plate mounting assembly of said attaching apparatus includes a backing plate; and
wherein said backing plate of said license plate mounting assembly of said attaching apparatus is for replaceably holding the license plate of the vehicle.

71. The one-size fits-all protector of claim 70, wherein said backing plate of said license plate mounting assembly of said attaching apparatus indirectly attaches to said center part of said bottom layer of said body.

72. The one-size fits-all protector of claim 70, wherein said backing plate of said license plate mounting assembly of said attaching apparatus passes through said through opening of said center part of said top layer of said body.

\* \* \* \* \*